(12) United States Patent
Kiyomiya (10) Patent No.: US 12,518,498 B2
(45) Date of Patent: Jan. 6, 2026

(54) IMAGE PROCESSING METHOD, INFORMATION PROCESSING APPARATUS, AND COMPUTER PROGRAM PRODUCT

(71) Applicant: BANDAI CO., LTD., Tokyo (JP)

(72) Inventor: Ryota Kiyomiya, Tokyo (JP)

(73) Assignee: BANDAI CO., LTD., Tokyo (JP)

( * ) Notice: Subject to any disclaimer, the term of this patent is extended or adjusted under 35 U.S.C. 154(b) by 204 days.

(21) Appl. No.: 18/464,656

(22) Filed: Sep. 11, 2023

(65) Prior Publication Data

US 2024/0087271 A1    Mar. 14, 2024

(30) Foreign Application Priority Data

Sep. 13, 2022 (JP) .................................. 2022-145489

(51) Int. Cl.
  *G06T 19/20* (2011.01)
  *G06T 7/73* (2017.01)
  *G06T 17/00* (2006.01)

(52) U.S. Cl.
  CPC ............... *G06T 19/20* (2013.01); *G06T 7/73* (2017.01); *G06T 17/00* (2013.01); *G06T 2207/10016* (2013.01); *G06T 2207/20092* (2013.01); *G06T 2207/30204* (2013.01); *G06T 2219/2016* (2013.01); *G06T 2219/2021* (2013.01)

(58) Field of Classification Search
  None
  See application file for complete search history.

(56) References Cited

U.S. PATENT DOCUMENTS

| | | | |
|---|---|---|---|
| 9,545,563 B2 * | 1/2017 | Yim | A63F 13/537 |
| 10,089,772 B2 * | 10/2018 | Taylor | A63F 13/213 |
| 10,297,026 B1 * | 5/2019 | Jordan | G06V 10/757 |
| 10,380,803 B1 * | 8/2019 | Jaafar | G06T 19/006 |
| 12,059,615 B2 * | 8/2024 | Shen | A63F 13/655 |
| 2014/0378022 A1 * | 12/2014 | Muthyala | G06T 19/20 446/91 |
| 2017/0186241 A1 * | 6/2017 | Zavesky | G06T 15/50 |
| 2018/0264365 A1 * | 9/2018 | Soederberg | A63F 13/655 |
| 2021/0142579 A1 * | 5/2021 | Jeong | G06T 7/251 |
| 2021/0146265 A1 * | 5/2021 | Lamm | G06F 3/0482 |
| 2021/0174599 A1 * | 6/2021 | Kurabayashi | A63F 13/98 |
| 2021/0225078 A1 * | 7/2021 | Matsumoto | G06T 17/00 |
| 2024/0037877 A1 * | 2/2024 | Lamm | A63F 13/63 |

FOREIGN PATENT DOCUMENTS

JP    2020-107251 A    7/2020

* cited by examiner

*Primary Examiner* — Ryan M Gray
(74) *Attorney, Agent, or Firm* — Rabin & Berdo, P.C.

(57) ABSTRACT

An image processing method of reconstructing a video image includes: causing a processor to generate, from a plurality of images captured of an exterior of a model in a plurality of directions and generated by an imaging device, first three-dimensional model data of the model included in the images; causing the processor to reconstruct the video image by replacing second three-dimensional model data with the first three-dimensional model data in template data of a video image constructed in advance to include the second three-dimensional model data; and causing an output device to output information indicating a destination from which the reconstructed video image is acquired.

14 Claims, 10 Drawing Sheets

IMAGE PROCESSING METHOD, INFORMATION PROCESSING APPARATUS, AND COMPUTER PROGRAM PRODUCT

CROSS REFERENCES TO RELATED APPLICATIONS

The present invention contains subject matter related to Japanese Patent Application No. 2022-145489 filed in the Japan Patent Office on Sep. 13, 2022, the entire contents of which are incorporated herein by reference.

BACKGROUND OF THE INVENTION

1. Field of the Invention

The present invention relates to an image processing method, an information processing apparatus, and a computer program.

2. Description of the Related Art

Japanese Unexamined Patent Application Publication No. 2020-107251 describes a technique for primitively mapping, on a virtual space, a texture generated from a captured image group of images captured of a target object in a plurality of image capture directions by an imaging unit to generate a virtual space image viewable from a virtual camera in the virtual space.

In the above-described technique, it is expected to efficiently perform reconstruction processing in capturing video of a target object and reconstructing a video image using the captured video of the target object.

SUMMARY OF THE INVENTION

Accordingly, it is an object of the present invention to make it possible to efficiently perform reconstruction processing in capturing video of a target object and reconstructing a video image using the captured video of the target object.

In order to achieve the above-described object, according to an aspect, an image processing method of reconstructing a video image includes: causing a processing unit to generate, from a plurality of images captured of an exterior of a model in a plurality of directions and generated by an imaging unit, first three-dimensional model data of the model included in the images; causing the processing unit to reconstruct the video image by replacing second three-dimensional model data with the first three-dimensional model data in template data of a video image constructed in advance to include the second three-dimensional model data; and causing an output unit to output information indicating a destination from which the reconstructed video image is acquired.

It is possible to efficiently perform reconstruction processing in capturing video of a target object and reconstructing a video image using the captured video of the target object.

DESCRIPTION OF THE PREFERRED EMBODIMENTS

Hereinafter, embodiments are described with reference to the accompanying drawings. The following embodiments are not intended to limit the invention described in Claims, and not all of combinations of features described in the embodiments are necessarily essential for the invention. Any two or more of the features described in the embodiments may be combined. In addition, configurations that are the same as or similar to each other are denoted by the same reference signs, and redundant description is omitted. Furthermore, in each drawing, upper, lower, left, right, front, and back directions with respect to the paper sheet of the drawing are treated as upper, lower, left, right, front, and back directions of components (or parts) in the embodiments and are used for the following description.

Figure 1A:
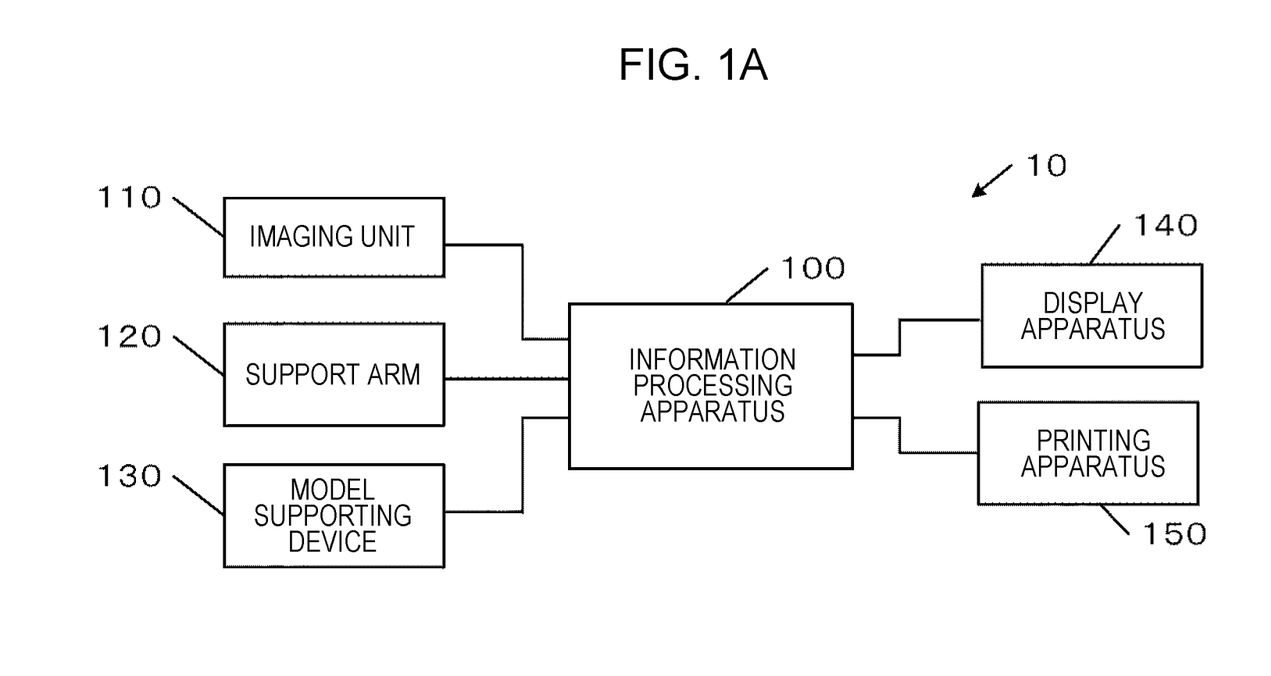
FIGS. 1A and 1B are diagrams illustrating an example of a configuration of an image processing system according to an embodiment and an example of a hardware configuration of an information processing apparatus.

First, a configuration of an image processing system according to the present embodiment is described. FIG. 1A is a diagram illustrating an example of an image processing system 10 according to the present embodiment. The image processing system 10 is formed by connecting an imaging unit ("imaging device") 110, a support arm 120, a model supporting device 130, a display apparatus 140, a printing apparatus 150, and the like to an information processing apparatus 100. The system configuration is not limited to the configuration illustrated in FIG. 1A. The information processing apparatus 100 may be further connected to an external server, a cloud server, and the like via a network. The external server and the like can execute at least a part of processing according to the embodiment described below.

The information processing apparatus 100 controls an operation of at least any of the imaging unit 110, the support arm 120, and the model supporting device 130, captures, from any angle, an image of an article targeted for image capture to generate a plurality of images, and generates three-dimensional model data (main data) from the plurality of images. The information processing apparatus 100 can use a template (PV template) of a video image (promotional video (PV data)) including temporal three-dimensional model data (temporal data) prepared in advance to transform the temporal data in the PV template into the main data by replacing the temporal data in the PV template with the main data so as to reconstruct the PV data. In addition, the information processing apparatus 100 can use the generated main data as data for a virtual space to function as an image processing apparatus that generates an image to be displayed in the virtual space. The image processing apparatus may be prepared separately from the information processing apparatus 100. In the present embodiment, the article targeted for image capture is any of a plastic model that can be assembled, an action figure (figure with a movable joint portion), a toy body, a doll, and the like, which are collectively referred to as "models". In addition, in the present embodiment, the promotional video (PV) is not limited to video for promoting the sales of or advertising the model targeted for image capture. The promotional video (PV) may be an attractive video image (the format and the type of the video image are not limited and the video image may be a short movie, a movie, demonstration video, or the like) including the model targeted for image capture. In the following description, a "PV" or a "promotional video" is used as a general term including the above-described video images.

The imaging unit 110 is an imaging device that captures (scans) an image of a three-dimensional shape of the model targeted for image capture and outputs the image of the model targeted for image capture under control by the information processing apparatus 100. For example, as the imaging unit 110, a smartphone equipped with a camera and having installed therein an application for capturing an image of a three-dimensional shape can be used. In addition, the imaging unit 110 may be configured as a three-dimensional scanner device that can output a three-dimensional shape and color information. For example, as the three-dimensional scanner device, Artec Space Spider made by Artec 3D can be used. For example, the imaging unit 110 can acquire three-dimensional model data of the whole model by acquiring about 500 to 800 frames of scanned images of the model.

The support arm 120 is a position and posture control device that moves the imaging unit 110 in accordance with control by the information processing apparatus 100 such that the imaging unit 110 is at a predetermined image capture position and in a predetermined posture. The support arm 120 may be configured such that the position and the posture of the support arm 120 can be manually changed and that the position and the posture of the support arm 120 after the changes can be fixed and maintained. The support arm 120 may be configured to be controllable by the information processing apparatus 100. In a case where the support arm 120 is configured to be controllable by the information processing apparatus 100, xArm 7 made by UFACTORY can be used as the support arm 120. xArm7 includes 7 joints and can move in a similar manner to a human arm. The imaging unit 110 may be manually positioned, instead of using the support arm 120.

The model supporting device 130 is a supporting table for supporting the model in a fixed pose. The model supporting device 130 may be configured to be rotatable in a state in which the model is set on the supporting table or is set on an edge of a supporting rod. In the present embodiment, after the imaging unit 110 is positioned at any image capture position and oriented at any image capture angle by the support arm 120, the imaging unit 110 performs image capture while the model supporting device 130 is rotated at 360 degrees. The imaging unit 110 captures images of the model at a plurality of image capture positions and a plurality of image capture angles, and thus an image of the whole model can be acquired. In this case, by driving the support arm 120 and the model supporting device 130 in synchronization with each other, it is possible to simply perform an image capture process with high accuracy. In addition, the imaging unit 110 may be manually moved around the model instead of the model supporting device 130 and may perform image capture at any image capture position and any image capture angle.

The display apparatus 140 is a liquid crystal display (LCD) or the like and displays an image captured by the imaging unit 110, main data of three-dimensional model data generated from the captured image, and PV data reconstructed using the main data. In addition, the display apparatus 140 can display, on a screen, a two-dimensional barcode (QR code) indicating a link of a download destination. The printing apparatus 150 prints, on a paper medium or the like, the QR code indicating the link of the download destination from which the reconstructed PV data is acquired by a user in order for the user to view and listen to the PV data.

Figure 1B:
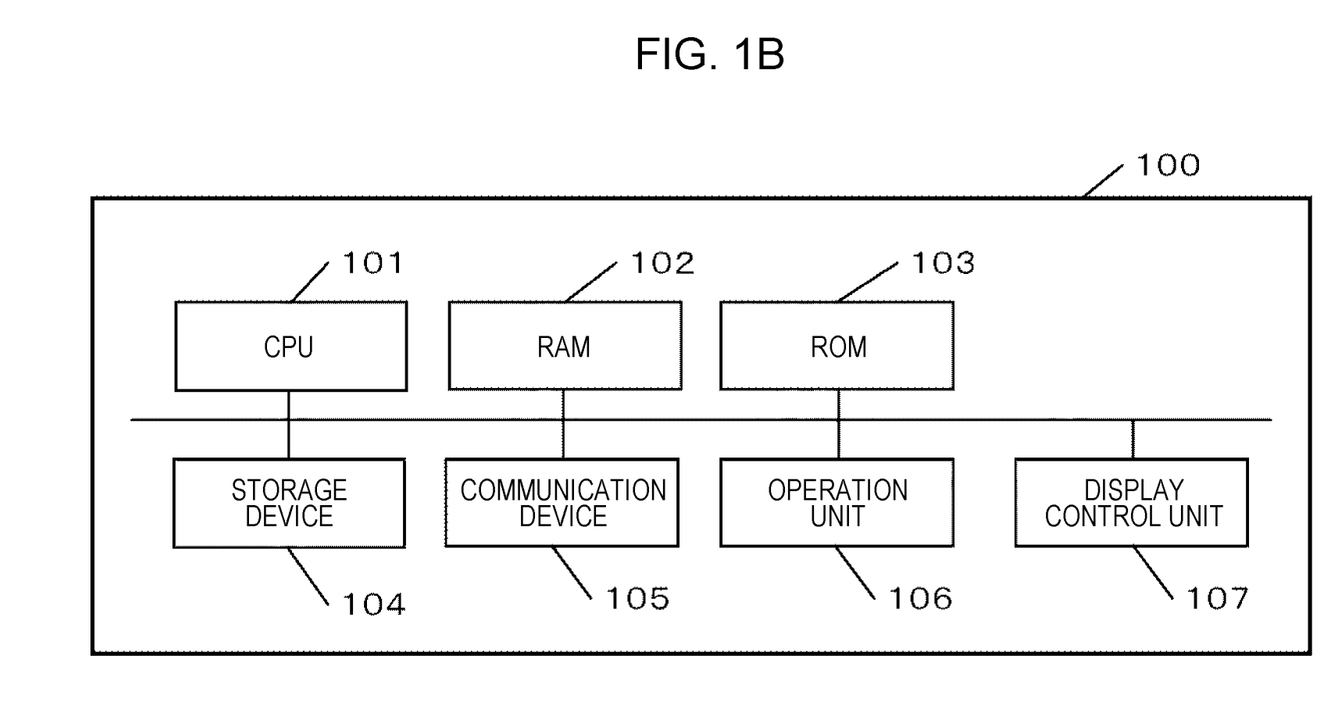

FIG. 1B illustrates an example of a hardware configuration of the information processing apparatus 100. A CPU 101 is a device that controls the entire information processing apparatus 100 and calculates, processes, and manages data. For example, the CPU 101 can control the timing of capturing an image by the imaging unit 110 and the number of images to be captured by the imaging unit 110, and can control a joint of the support arm 120 to position and orient the imaging unit 110 at any image capture position and any image capture angle. In addition, after the image capture position and the image capture angle of the imaging unit 110 are determined, the CPU 101 can rotate the model supporting device 130 and cause the imaging unit 110 to perform an image capture operation. Furthermore, the CPU 101 may function as an image processing unit ("processor") that processes an image output from the imaging unit 110.

A RAM 102 is a volatile memory (non-transitory computer readable medium) and is used as a main memory of the CPU 101 or a temporary storage region such as a work area of the CPU 101. A ROM 103 is a nonvolatile memory. Image data, other data, various programs for causing the CPU 101 to operate, and the like are stored in predetermined regions in the ROM 103. For example, the CPU 101 uses the RAM 102 as the work area to control units included in the information processing apparatus 100 in accordance with a program stored in the ROM 103. The program for causing the CPU 101 to operate may not be stored in the ROM 103 and may be stored in a storage device 104.

The storage device 104 includes a magnetic disk such as an HDD or a flash memory, for example. In the storage device 104, an application program, an OS, a control program, a related program, a game program, and the like are stored. In addition, in the storage device 104, data of the PV template to be reconstructed is stored. The PV template includes the temporal data. Sizes and poses of three-dimensional models may differ for PV templates. Data can be read from and written to the storage device 104 based on control by the CPU 101. The storage device 104 may be used instead of the RAM 102 and the ROM 103.

A communication device 105 is a communication interface for communicating with the imaging unit 110, the support arm 120, and the model supporting device 130 based on control by the CPU 101. The communication device 105 may be configured to be able to further communicate with the external server and the like. The communication device 105 can include a wireless communication module. The wireless communication module can include a known circuit mechanism including an antenna system, an RF transceiver, one or more amplifiers, a tuner, one or more oscillators, a digital signal processor, a CODEC chip set, a subscriber identification module card, a memory, and the like. Wireless communication may be performed between the information processing apparatus 100, and the imaging unit 110, the support arm 120, and the model supporting device 130.

In addition, the communication device 105 can include a wired communication module for wired communication. The wired communication module can communicate with other devices including the display apparatus 140 via one or more external ports. Furthermore, the wired communication module can include various software components for processing data. The one or more external ports are directly connected to the other devices via Ethernet, USB, IEEE1394, or the like or are indirectly connected to the other devices via a network. Software that implements functions equivalent to those of the above-described devices can be configured instead of the hardware devices.

An operation unit 106 includes, for example, one or more of a button, a keyboard, a touch panel, and the like and receives an input operation from the user. A display control unit 107 functions as an interface for displaying information on the display apparatus 140 connected to the information processing apparatus 100 and controls an operation of the display apparatus 140. One or more of functions of the operation unit 106 may be provided in the display apparatus 140. That is, the display apparatus 140 may be configured as a device having a touch panel, such as a tablet terminal.

Figure 2:
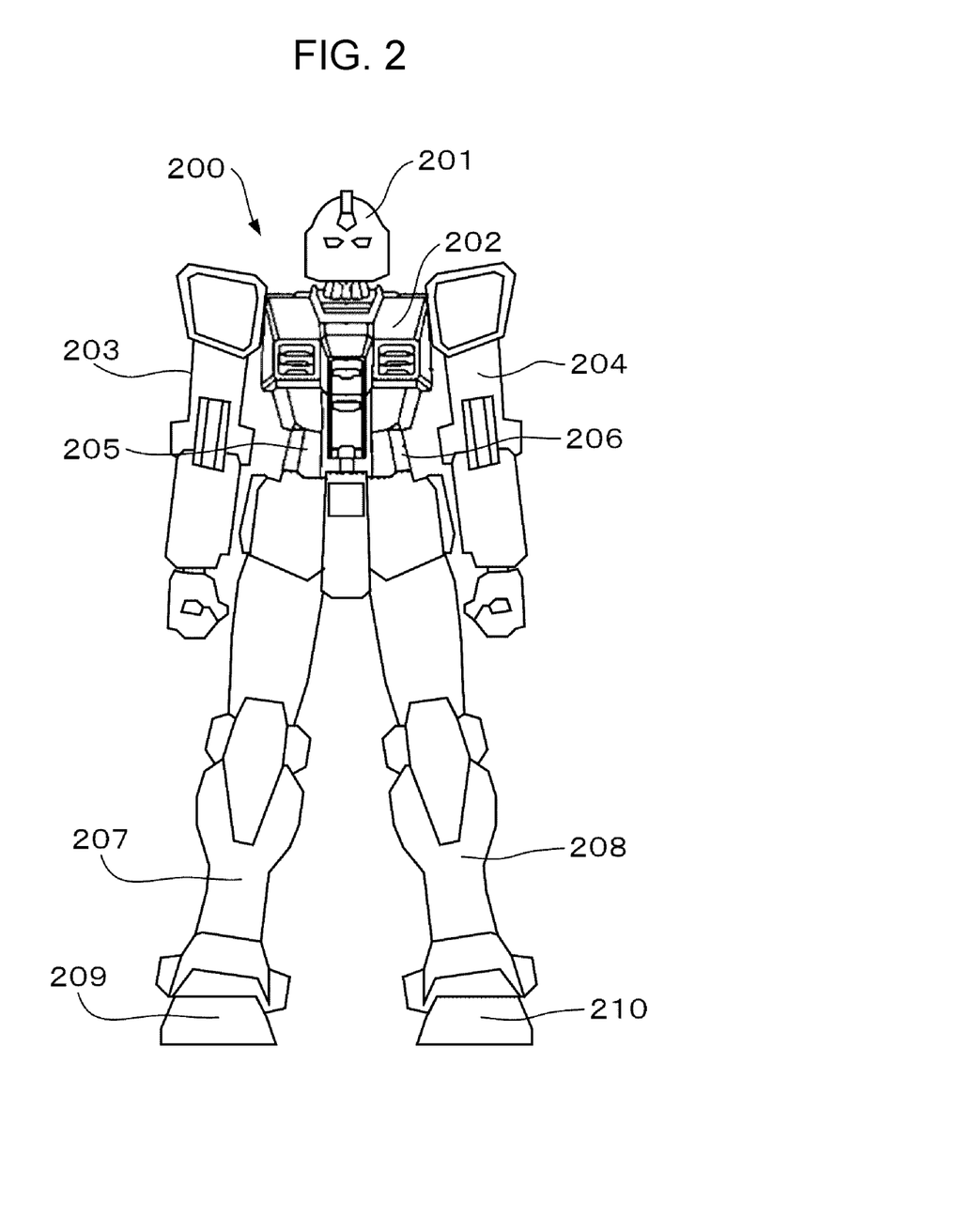
FIG. 2 is a diagram illustrating an example of an exterior of a model according to the embodiment.

Next, an example of the model targeted for image capture in the present embodiment is described with reference to FIG. 2. A model 200 has a doll-type (robot-type or human-type) exterior. The model can be assembled as a plastic model and can be painted, for example. Alternatively, the model may be a completed model such as a figure (action figure) having a movable joint portion. The model illustrated in FIG. 2 is an example for explanation. The model is not limited to a model having a doll-type exterior and may have any shape, like a general vehicle, a racing vehicle, a military vehicle, an aircraft, a ship, an animal, a virtual creature, and the like. The article targeted for image capture is not limited to the model as long as the article has a three-dimensional shape of which an image can be captured by the imaging unit 110.

The model 200 includes a head portion 201, a chest portion 202, a right arm portion 203, a left arm portion 204, a right body portion 205, a left body portion 206, a right leg portion 207, a left leg portion 208, a right foot portion 209, and a left foot portion 210 and is formed by coupling the portions 201 to 210 to each other. At least one of the portions 201 to 210 is supported so as to be rotatable (or swingable) with respect to a portion adjacent to the at least one portion. For example, the head portion 201 is supported so as to be rotatable with respect to the chest portion 202, and the right arm portion 203 and the left arm portion 204 are supported so as to be rotatable with respect to the chest portion 202. Since each of the portions of the model 200 has a joint structure as described above, the model 200 can be in any posture.

Figure 3A:
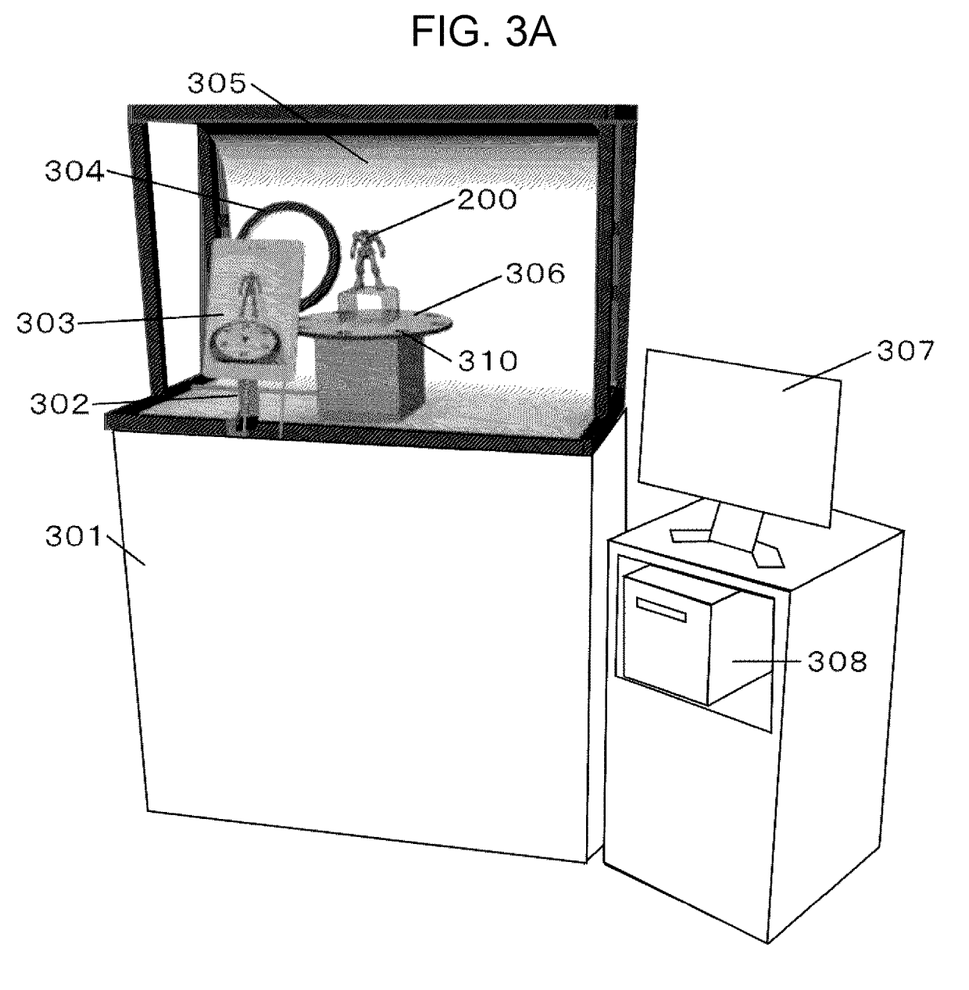
FIGS. 3A to 3C are diagrams illustrating an example of implementation of the image processing system according to the embodiment and an example of an AR marker.
Figure 3B:
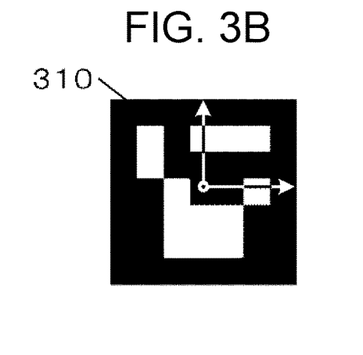
Figure 3C:
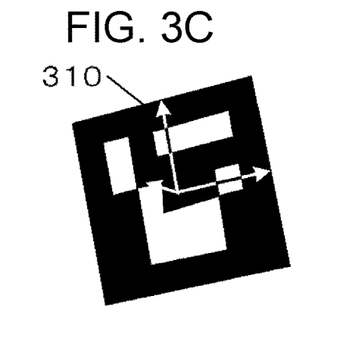

Next, an example of implementation of the image processing system 10 according to the present embodiment is described with reference to FIGS. 3A to 3C. FIG. 3A illustrates an example of implementation in which PV data is reconstructed from main data generated by capturing an image of the model and in which a download link for viewing and listening to the reconstructed PV data can be issued by a printer. FIGS. 3B and 3C are diagrams illustrating an example of a configuration of an augmented reality (AR) marker according to the present embodiment.

In FIG. 3A, the information processing apparatus 100, a drive system for driving a support arm 302, a drive system for driving a turn table 306, and the like are included in a casing 301. The support arm 302 can be manually adjusted to adjust an image capture direction and an image capture position. The casing 301 has a flat surface to which an advertisement poster can be attached.

The support arm 302 corresponds to the support arm 120 and supports a terminal 303 and can fix the position of the terminal 303 in accordance with control by the information processing apparatus 100 or manually. The terminal 303 functions as the imaging unit 110. The support arm 302 can operate to control an inclination of the terminal 303.

The terminal 303 is a touch panel type terminal having a built-in camera. For example, as the terminal 303, a smartphone, a tablet terminal, a digital camera, or the like can be used. The terminal 303 can capture an image of the model 200 and transmit the captured image to the information processing apparatus 100. A ring light 304 is an illuminating device that is used for the capturing of the image of the model 200 by the terminal 303. The ring light 304 can evenly illuminate the model 200 with light so as to reduce a shadow. As additional light sources, a top light may be installed and auxiliary lights may be installed on the left, right, and lower sides of the ring light 304, in addition to the ring light 304.

A background sheet 305 is provided for image capture. For example, as the background sheet 305, a white sheet can be used. The model 200 can be set on the turn table 306 and rotated by the turn table 306. On the turn table 306, such a plurality of AR markers 310 as illustrated in FIG. 3B are arranged. The AR markers 310 are used to adjust the orientation and the position of the model of which an image has been captured. As illustrated in FIGS. 3B and 3C, it is possible to identify three-dimensional coordinates from the AR markers 310 and identify inclinations of X, Y, and Z axes. For example, in a case where three-dimensional coordinates identified from the AR marker 310 illustrated in FIG. 3B are used as reference coordinates, it is possible to accurately correct the orientation and the inclination of the main data by matching three-dimensional coordinates identified from the AR marker 310 illustrated in FIG. 3C with the reference coordinates.

In FIG. 3A, the model is set on the translucent (transparent) table. However, instead of this table, a support tool that is referred to as an "action base" may be used. The action base includes a stage and a columnar support bent into a "<" shape and disposed on the stage. The model can be attached to an edge of the columnar support. In this case, an AR marker may be disposed on an edge portion of the columnar support. A method of supporting the model can be changed according to the pose of the model. For example, in a state in which the model is in an upright posture, it is possible to set the model on the transparent table and capture an image of the model set on the transparent table. In a state in which the model is in a flying posture, and it is necessary to capture an image of soles of the model, the action base may be used to capture an image of the model in the flying posture. The action base may be used to capture an image of the model in an upright posture.

A display apparatus 307 corresponds to the display apparatus 140 and may have a touch panel function. For example, an icon image can be displayed on the display apparatus 140 as an option for a PV that the user wants to reconstruct, and the display apparatus 140 can accept selection from the user. A printer 308 is, for example, a thermal printer. After the reconstruction of PV data is completed, the printer 308 can print a QR code indicating a URL through which the PV data can be downloaded. In addition, the QR code may be displayed on the display apparatus 307 and read by a smartphone used by the user or the like.

Figure 4A:
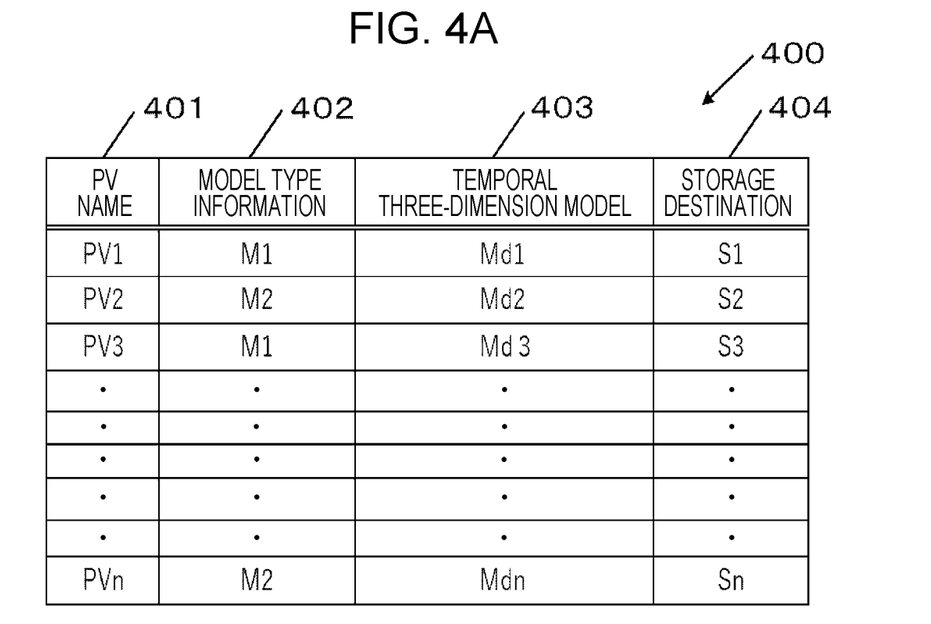
FIGS. 4A and 4B are diagrams illustrating an example of data configurations of data tables according to the embodiment.

Next, data structures of various tables stored in the storage device 104 of the information processing apparatus 100 are described with reference to FIGS. 4A and 4B. In a PV management table 400 illustrated in FIG. 4A, model type information 402 identifying a model type of a model, information 403 of temporal data included in a PV, and a storage destination 404 of PV template data are registered in association with a PV name 401.

In the PV name 401, identification information for uniquely identifying the template data of the promotional video (PV) as the origin of a video image to be reconstructed in the present embodiment is registered. The model type information 402 is information for identifying the model type of the model corresponding to the PV. In the present embodiment, a PV may be prepared for each of model types. For example, PVs may be prepared for a model having a normal shape (for example, an exterior shape obtained by reducing the original shape of the model as it is) as a first shape and a model having a deformed shape (for example, an exterior shape obtained by deforming the original shape of the model to enlarge the original shape by a factor of 2 or 3) as a second shape. The model type information 402 indicates that a PV corresponding to a model type M1 corresponds to a model having the first shape and that a PV corresponding to a model type M2 corresponds to a model having the second shape.

In the temporal data information 403, information of the temporal data included in the PV is registered. In the present embodiment, the template data of the PV is constructed using the temporal data, and the PV can be reconstructed by replacing the temporal data with main data generated from a captured image. The storage destination 404 indicates information of a storage destination of the temperate data of the PV.

In the table 400, other information regarding the PV can be registered. The information includes information regarding an icon image for PV selection, a sample movie, and a recommended pose in the PV, for example.

Figure 4B:
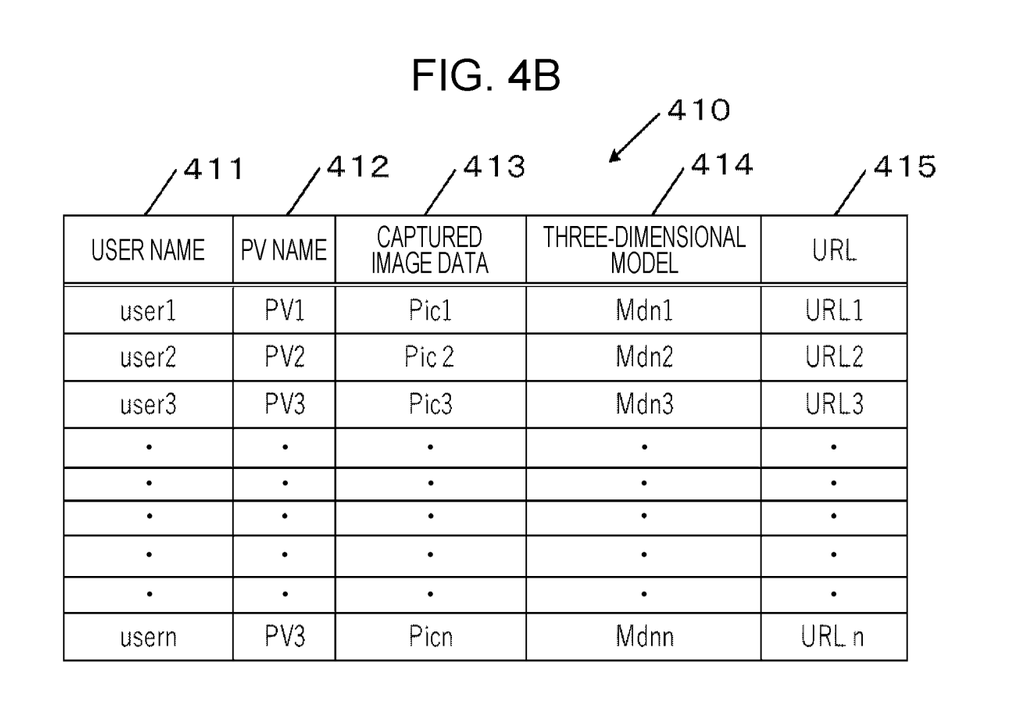

FIG. 4B illustrates an example of a configuration of a user information table 410 in which information of a user who uses the image processing system 10 is registered. In the table 410, a user name 411, a PV name 412, captured image data 413, a three-dimensional model 414, and a URL 415 are registered. The user name 411 is information for uniquely identifying a user (or a player) who is an owner of a model of which an image has been captured by the imaging unit 110. In the PV name 412, a PV name selected by the user is registered. The PV name 412 corresponds to any one of information items registered as the PV name 401 in the table 400.

In the captured image data 413, information of the image captured by the imaging unit 110 and including the model owned by the user registered in the user name 411 is registered. In the three-dimensional model 414, main data generated based on the captured image data 413 is registered. The URL 415 is link information that indicates a storage location of PV data reconstructed using the main data registered in the three-dimensional model 414 and is a URL indicated by a QR mode printed by the printing apparatus 150.

Figure 5:
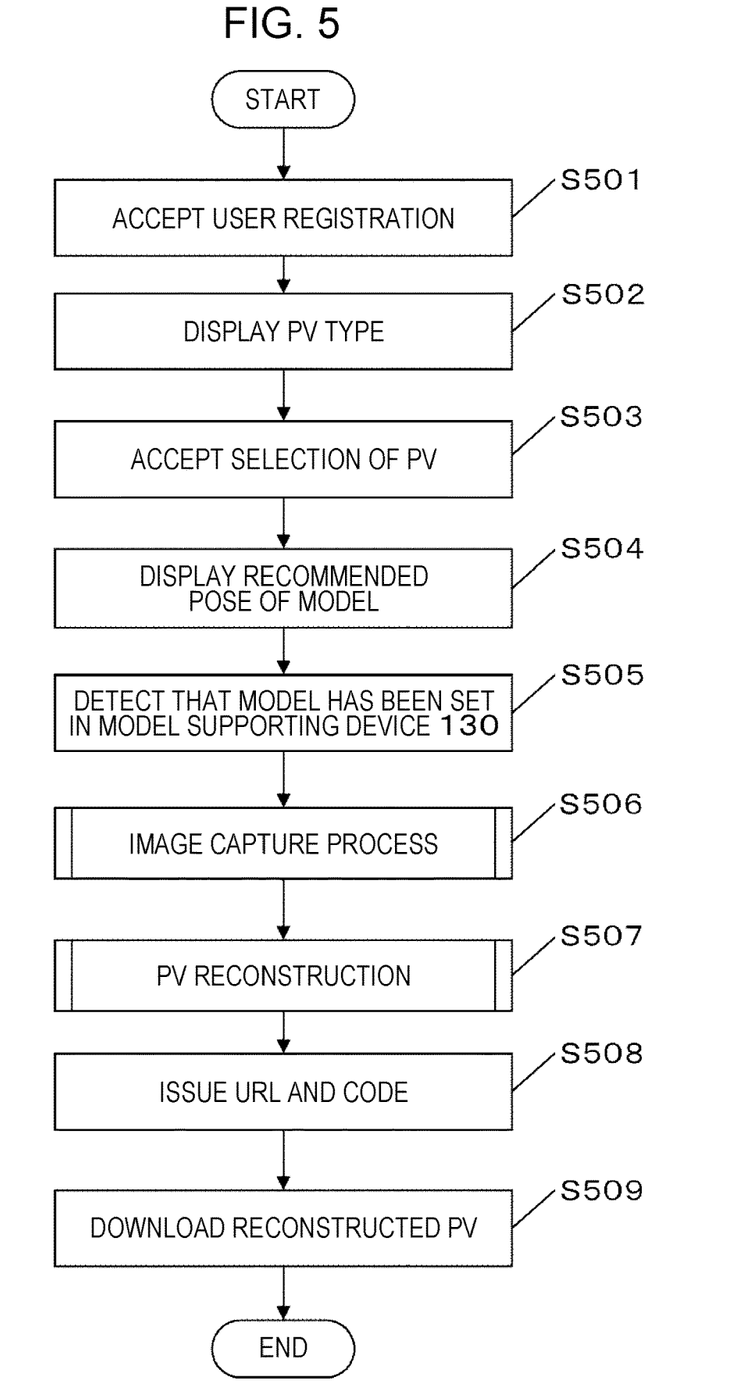
FIG. 5 is a flowchart illustrating an example of a process of generating PV data according to the embodiment.

Next, an example of a process that is performed by the information processing apparatus 100 according to the present embodiment is described with reference to FIG. 5. At least a part of the process corresponding to a flowchart illustrated in FIG. 5 is implemented by the CPU 101 of the information processing apparatus 100 executing a program stored in the ROM 103 or the storage device 104.

First, in S501, the CPU 101 accepts user registration. The CPU 101 accepts input of a user name and user's contact information. The CPU 101 assigns, to each user, a user identifier for uniquely identifying the user. The user identifier corresponds to the user name 411 illustrated in FIG. 4B. The CPU 101 stores, to the storage device 104, the input user information in association with the time when the input has been accepted and the user identifier.

Subsequently, in S502, the CPU 101 displays an icon for a selectable promotional video (PV) on the display apparatus 140 via the display control unit 107 and accepts selection of a PV that the user wants to create. Any number of icons for PVs are present, and the PVs include different scenes. In this case, the CPU 101 may display a sample movie on the display apparatus 140. In addition, PVs may be prepared for model types. For example, PVs may be prepared for a model having a normal shape (for example, an exterior shape obtained by reducing the original shape of the model as it is) as a first shape and a model having a deformed shape (for example, an exterior shape obtained by deforming the original shape of the model to enlarge the original shape by a factor of 2 or 3) as a second shape. The user can determine whether the model owned by the user has a normal shape or a deformed shape, and select a PV corresponding to the shape of the model.

Subsequently, in S503, the CPU 101 accepts selection of a PV from the user. Identification information is assigned to each PV in advance. The CPU 101 associates the identification information of the PV for which the selection has been accepted by the CPU 101 with the user information accepted in S501, and stores, to the table 410 of the storage device 104, the identification information and the user information in association with each other.

Subsequently, in S504, the CPU 101 displays a recommended pose of a model in the selected PV on the display apparatus 140 via the display control unit 107. In the present embodiment, poses of models differ for PVs, and it is possible to reconstruct a realistic video image by capturing an image of an exterior of the model in the pose suitable for the selected PV. In the present embodiment, poses of the model include, for example, an upright posture, a flying posture, and an attacking posture. Since a PV of which the content corresponds to the upright posture, a PV of which the content corresponds to the flying posture, and a PV of which the content corresponds to the attacking posture are prepared, it is important to take a pose corresponding to the content of each PV in order to create a PV without any sense of discomfort.

The user checks the recommended pose of the model displayed on the display apparatus 140, determines the pose of the model owned by the user, and sets the determined pose in the model supporting device 130. The CPU 101 can determine whether the model has been set in the model supporting device 130 based on an image captured by the imaging unit 110. Alternatively, a switch that is switched on when a model is set in the model supporting device 130 may be provided and the CPU 101 may detect a signal from the switch to determine whether the model has been set in the model supporting device 130. Alternatively, a button for accepting an operation in a case where the model is completely set may be displayed on the display apparatus 140, and the CPU 101 may detect whether an operation performed on the button has been accepted. In S505, the CPU 101 uses any of the above-described methods to detect that the model has been set in the model supporting device 130. In response to the detection, the process proceeds to S506.

In S506, the imaging unit 110 performs the image capture process to generate images. The generated images are transmitted to the information processing apparatus 100, and the CPU 101 stores, to the table 410 of the storage device 104, the images as captured image data 413 in association with a user identifier and the like. Subsequently, in S507, the CPU 101 performs a process of reconstructing the PV based on the captured image data 413. The CPU 101 stores, to the storage device 104, the reconstructed PV data in association with the user information registered in S501.

Subsequently, in S508, a URL and a QR code for accessing the PV data by the user are issued. The URL and the QR code may be transmitted to a mail address of the user or may be displayed on the display apparatus 140. Upon receiving the URL and the QR code, the user can access the storage location of the PV data and download the PV data reconstructed in S509.

Figure 6:
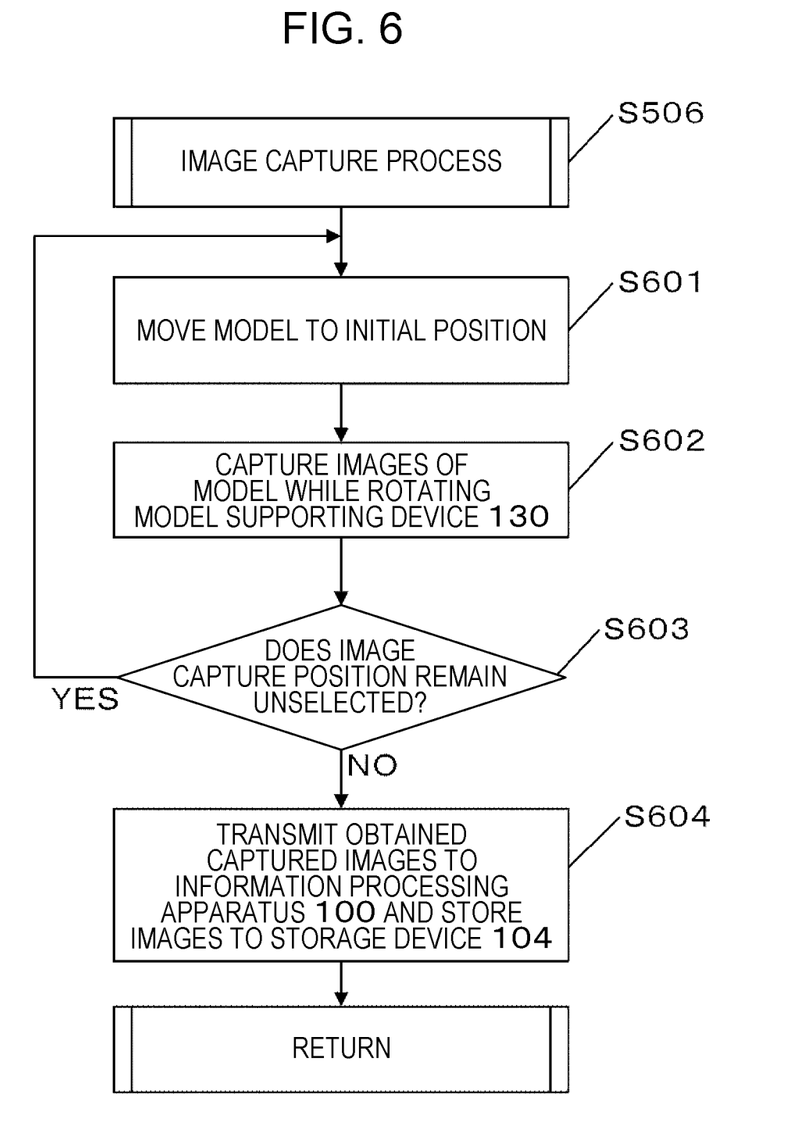
FIG. 6 is a flowchart illustrating an example of an image capture process according to the embodiment.

Next, the image capture process in S506 is described in detail with reference to FIG. 6. In the present embodiment, driving information of the support arm 120 and the number of times that the imaging unit 110 performs image capture at each of the image capture positions are registered for each of the image capture positions. In a case where image capture is performed at each of the image capture positions, the model supporting device 130 is rotated and the image capture is performed.

First, in S601, the CPU 101 controls the support arm 120 to move the imaging unit 110 to any of the image capture positions registered. Alternatively, the support arm 120 may be manually controlled to move the imaging unit 110 to any of the image capture positions registered. In addition, the CPU 101 controls the model supporting device 130 to move the model supporting device 130 to a rotation start position. Subsequently, in S602, while the CPU 101 rotates the model supporting device 130, the imaging unit 110 performs image capture at the image capture position to capture an image of the model 200. Therefore, it is possible to acquire a plurality of images captured at different image capture angles. For example, in a case where the image capture angle is changed by 15 degrees each time the image capture is to be performed, 24 images can be captured. In a case where the image capture angle is changed by 10 degrees each time the image capture is to be performed, 36 images can be captured. By reducing a range in which the image capture angle is changed each time the image capture is to be performed, the accuracy of main data to be generated at a succeeding stage is improved.

In this case, the CPU 101 may stop the model supporting device 130 at a specific rotational position, the CPU 101 may control the support arm 120 to change or a photographer may manually change the angle of the imaging unit 110, and the imaging unit 110 may capture an image of the model while being moved in a vertical direction. Therefore, it is possible to capture an image of the model from above the model or from below the model. Particularly, it is possible to capture an image of the soles of the model by performing image capture from below the model. In the present embodiment, the image capture directions and the image capture angles are selected so as to cover a whole circumference of the model, and the image capture is performed.

In the present embodiment, it is possible to capture an image of the model set on a transparent supporting rod extending from the model supporting device 130 such that the model floats above the model supporting device 130. Alternatively, it is possible to capture an image of the model set upright on a turn table of the model supporting device 130. In the former image capture mode, since it is possible to capture an image of the soles of the model, the image capture mode is suitable for capturing an image of the model in a flying posture. Meanwhile, in the latter image capture mode, although it is not possible to capture an image of the soles of the model, the image capture mode is suitable for capturing an image of the model in an upright posture. An image of the model in an upright posture may be captured in the former image capture mode.

In addition, an AR marker is disposed on the supporting rod and the turn table of the model supporting device 130. An image including the AR marker is generated in image capture. The AR marker is used to correct the orientation and the position of an object targeted for the image capture.

Subsequently, in S603, the CPU 101 determines whether an image capture position remains unselected among image capture positions set in advance. In a case where the image capture position remains unselected, the process returns to S601 and is continued. On the other hand, in a case where all the image capture positions are already selected, the process proceeds to S604. In S604, the imaging unit 110 transmits the images captured in the above-described manner to the information processing apparatus 100, and the CPU 101 stores, to the table 410 of the storage device 104, the received images as captured image data 413 in association with the user information and the like.

Figure 7:
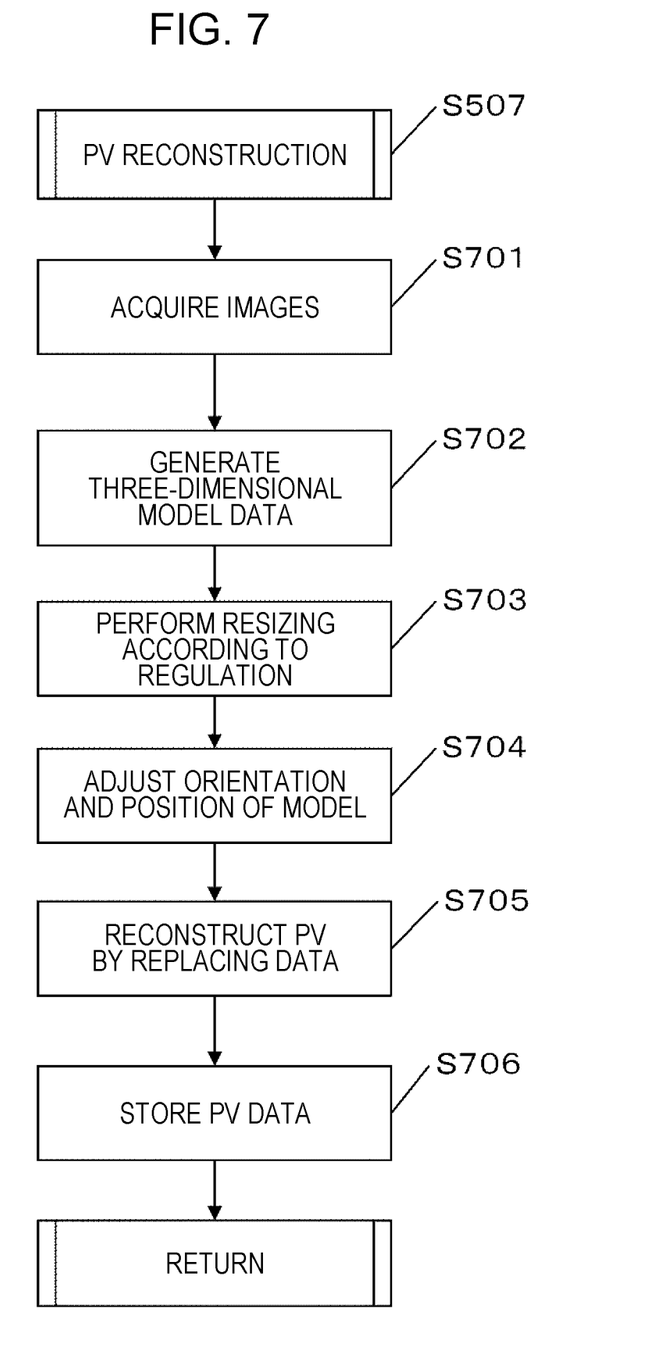
FIG. 7 is a flowchart illustrating an example of a process of reconstructing a PV according to the embodiment.

Next, the process in S507 of reconstructing the PV based on the captured images acquired in S506 is described in detail with reference to FIG. 7. First, in S701, the CPU 101 acquires the plurality of images captured by the imaging unit 110 and stored as the captured image data 413 in the storage device 104. Subsequently, in S702, the CPU 101 generates three-dimensional model data of the model as main data from the acquired plurality of images captured of the model at the different angles.

In the method of generating the three-dimensional model data, for example, it is possible to determine a three-dimensional model corresponding to the shape of the model according to a known visual hull using an image of the model acquired from the plurality of images. In this visual hull, a cone (visual volume) that has an apex at the position of a camera and whose cross section is a silhouette is generated using a plurality of model images, the silhouette is back-projected into a three-dimensional space, and the three-dimensional shape is restored as intersections (common portions) of the back-projected silhouette with the cone.

In S703, the CPU 101 uses a regulation regarding the position and the size of the model set in advance to perform processing of resizing the main data generated in S702. In a case where the model is out of an angular field of view for the planned PV, a part of the model is out of a display screen frame and cannot be viewed. Therefore, the resizing processing is performed to adjust the size of the model to enable the model to be viewed. Lengths of the model in the vertical and horizontal directions and the depth of the model are determined in advance for each PV. In a case where any of the lengths and the depth of the model exceeds a corresponding specified size, the model is resized such that the length or depth of the model is equal or smaller than the specified size. For a PV for the first shape, the resizing processing may be performed on a model having the first shape and may not be performed on a model having the second shape. Similarly, for a PV for the second shape, the resizing processing may be performed on a model having the second shape and may not be performed on a model having the first shape.

Subsequently, in S704, the CPU 101 adjusts the orientation and the position of the model resized according to the regulation. This processing of S704 may be performed before S703. An AR marker is included in the three-dimensional model, and the orientation and the position of a front surface of the three-dimensional model are determined in accordance with the orientation of this AR marker. Since how much the three-dimensional model is inclined or misaligned in an XYZ three-dimensional coordinate system is known according to the AR marker, the inclination or the misalignment is reset to reset the three-dimensional coordinate system. Alternatively, a correction value for the original three-dimensional coordinate system may be calculated and the orientation and the position of the three-dimensional model may be adjusted using the calculated correction value.

Since the orientation and the position are corrected, even in a case where the main data generated is corrected and the temporal data included in the PV template is replaced with the main data, the model is not misaligned in orientation and position in the PV. After the processing of S704, the AR marker can be removed from the main data.

In addition, in S704, the origin of the main data is determined. In a case where the model is in an upright posture, since the model is set on the ground or the like and displayed, the origin is set in a lowermost portion of the main data, and the orientation and the position of the main data are adjusted. In a case where the model is in an upright posture, the soles of the model serve as the origin and the model can be set on the ground. In addition, in a case where the model is in a flying posture instead of being in an upright posture, the position of the origin may be set at the position of the center of gravity of the model instead of being set in the lowermost portion. In a case where the model includes a weapon or other equipment, the position of the center of gravity of the model may change due to the weapon or the equipment, the position of the center of gravity of only the model excluding the weapon or the equipment may be determined in order to set the position of the center of gravity of the model. In a case where the temporal data in the PV template is replaced with the main data, the origin set in the main data serves as a reference for determining a position where the main data with which the temporal data is replaced is to be aligned.

Subsequently, in S705, the temporal data included in the PV template is replaced with the main data generated in the above-described step, and the temporal data is output as video image data of the PV. In the PV template, a background, a movement of an object, a camera angle, a movement and a camera angle (position of a viewing point) of the temporal data are set. It is possible to transform the template data into viewable and audible video image data and outputs the video image data. In this case, by replacing the temporal data with the main data generated in S702 to perform the transformation into the video image data, it is possible to reconstruct the PV data using any main data. The PV template can be generated using, for example, UNREAL ENGINE 5 (registered trademark).

Specifically, in the PV template, positional information of the object and the model in the three-dimensional space, information of positions where the object and the model start to be operated and movements (changes in position over time) of the object and the model in the three-dimensional space, information of a camera angle, effect information such as lighting, and the like are set. Regarding this template data, it is possible to generate video image data as PV data by replacing the temporal data with the main data generated in S702, operating and moving the main data in the three-dimensional space, performing another operation on the template data, cutting out the template data as a two-dimensional image in units of frames, and compressing the two-dimensional image by any video image coding method such as H.264.

Alternatively, a camera angle of three-dimensional data may be specified for each frame forming the PV data, a texture of the three-dimensional model corresponding to each camera angle may be generated, and the PV may be reconstructed by replacing a texture of the temporal data in units of the frames. Subsequently, in S706, the CPU 101 stores the PV data reconstructed in S705 to the storage device 104.

In the above description, the imaging unit 110 transmits the plurality of images captured by the imaging unit 110 to the information processing apparatus 100, and the information processing apparatus 100 generates the main data. However, in the processing of generating the main data from the plurality of images, the external server or the cloud server may be used. In this case, the information processing apparatus 100 can transmit the plurality of images to the external server or the cloud server and acquire the main data as a processing result. In addition, similarly, in the processing of reconstructing the PV in S705, the external server or the cloud server may be used.

Figure 8A:
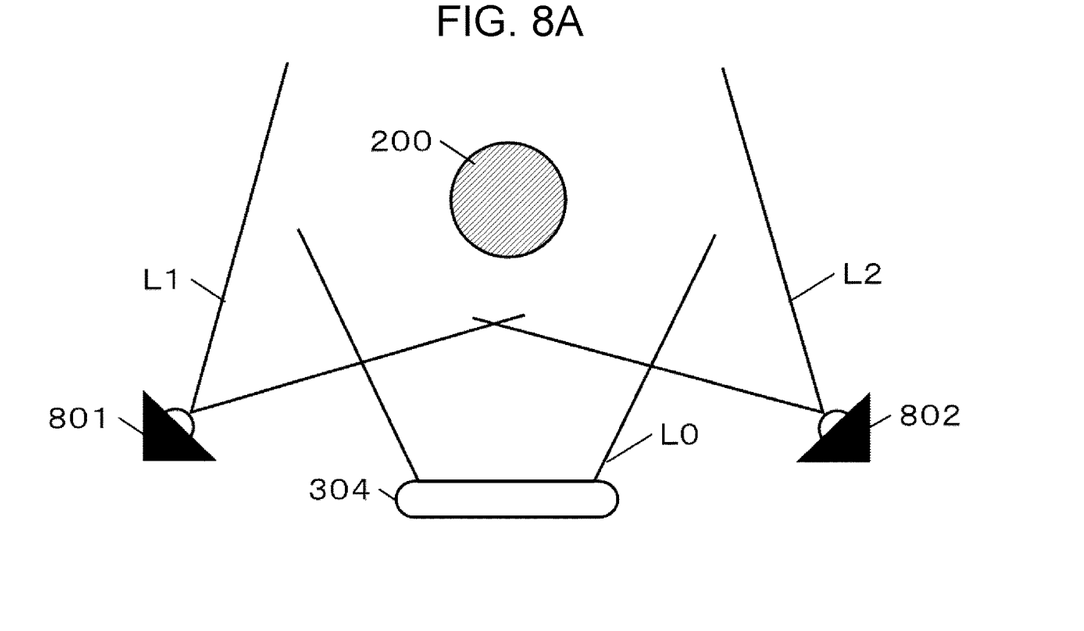
FIGS. 8A and 8B are diagrams for explaining an imaging environment in which an image of a model is captured according to the embodiment.
Figure 8B:
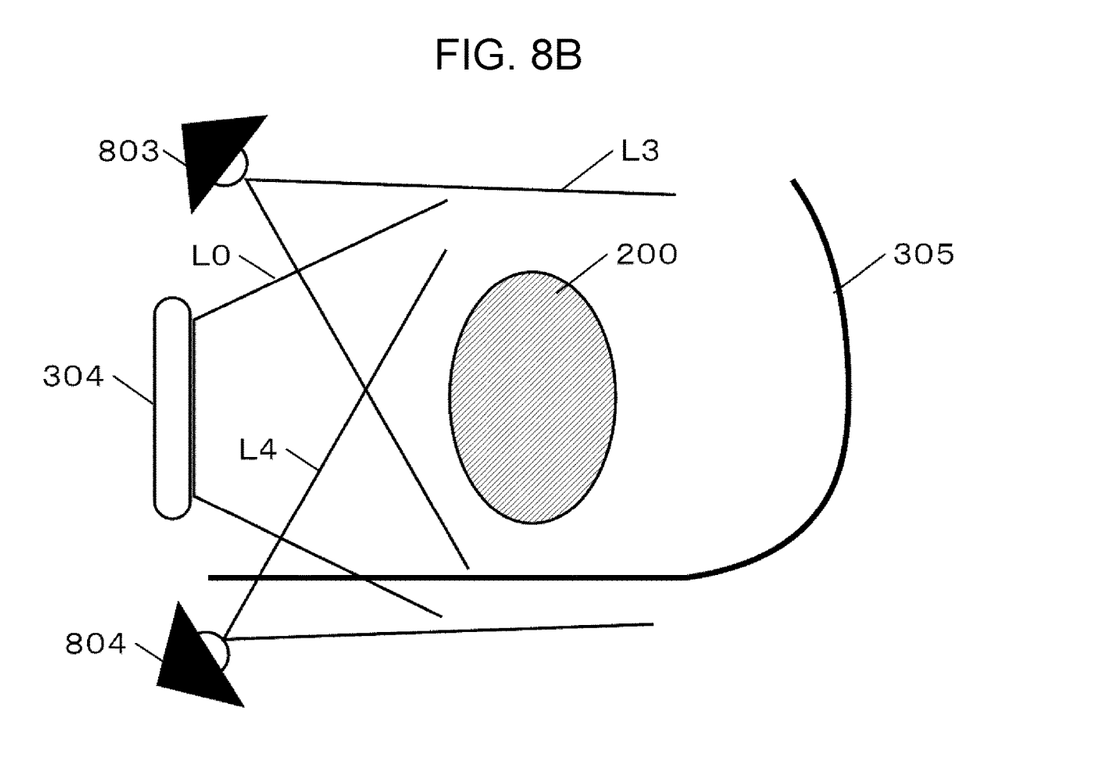

FIGS. 8A and 8B are diagrams illustrating lighting in a case where the imaging unit 110 captures an image of the model 200. FIG. 8A is a diagram illustrating an example of arrangement of lights as viewed from the top side of the model 200. A ring light 304 is disposed on the front side of the model 200 targeted for image capture. In a case where only the ring light 304 illuminates the model 200 that is a subject, the model 200 is illuminated with only illuminating light L0 from the top light 304 and a shadow is formed on the back side of the model 200. Therefore, auxiliary lights 801 and 802 are disposed on both sides of the ring light 304, and illuminating light L1 and L2 from the auxiliary lights 801 and 802 is used to prevent a shadow from being formed in an image capture range.

FIG. 8B is a diagram illustrating an example of arrangement of lights as viewed from one side of the model 200. A top light 803 is disposed above the ring light 304 on the front side of the model 200 targeted for image capture. An auxiliary light 804 is disposed below the ring light 304 on the front side of the model 200 targeted for image capture. The top light 803 illuminates the head portion of the model 200 to acquire a clear image of the head portion and a shadow caused by illuminating light L3 emitted by the top light 803 is offset by illuminating light L4 emitted by the auxiliary light 804. The shadow caused by the illuminating light L3 emitted by the top light 803 is also offset by the illuminating light L1 and L2 emitted by the auxiliary lights 801 and 802 described above.

Not all of the auxiliary lights 801, 802 illustrated in FIG. 8A and the top light 803 and the auxiliary lights 804 illustrated in FIG. 8B need to be used. One or more of the auxiliary lights 801, 802, and 804 and the top light 803 can be used to offset the shadow caused by the ring light 304.

Figure 9A:
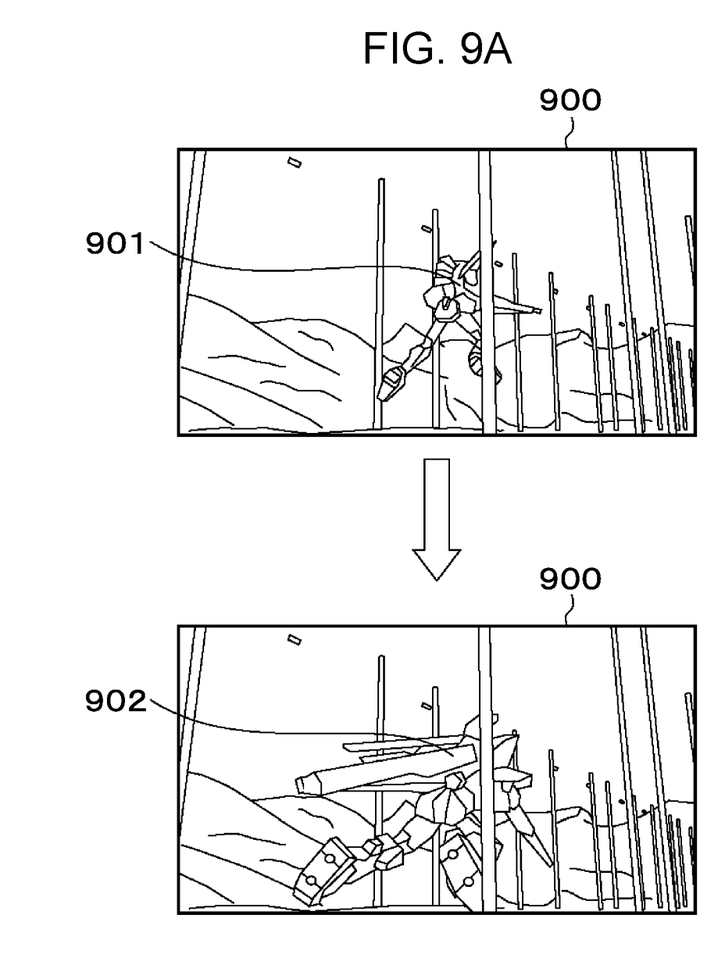
FIGS. 9A and 9B are diagrams illustrating an example of comparison of an output result in a case where a PV template is transformed for temporal data and an output result in a case where a PV template is transformed for main data.
Figure 9B:
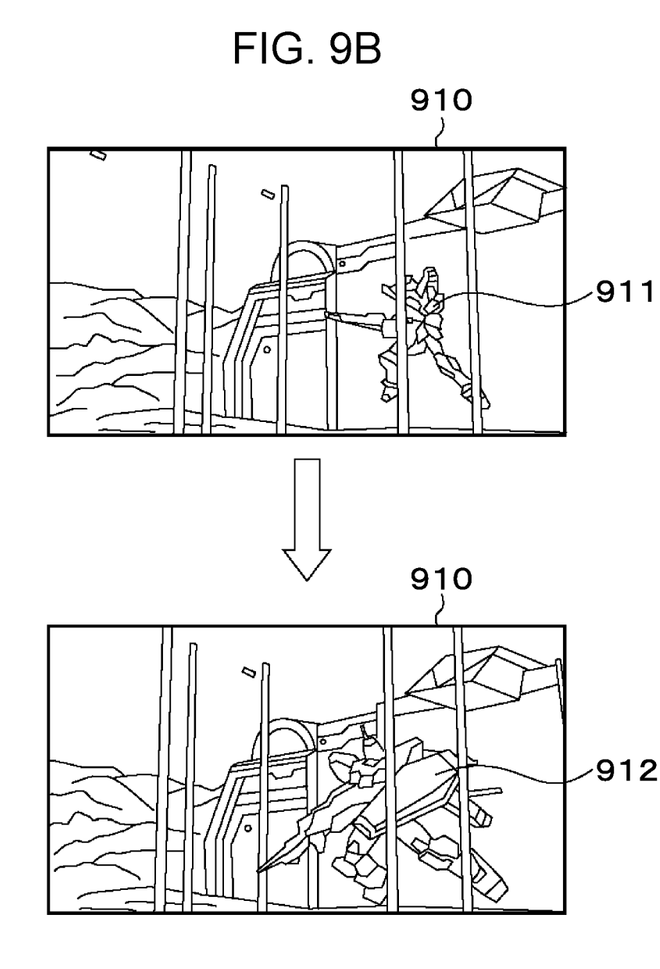

FIGS. 9A and 9B illustrate an example of comparison of an output result in a case where a PV template is transformed for temporal data and an output result in a case where a PV template is transformed for main data. In FIG. 9A, an output result is displayed in a case where transformation is performed on a PV template with temporal data 901 in a scene 900, and an output result is displayed in a case where transformation is performed on a PV template with main data 902 in the scene 900 after reconstruction. In FIG. 9A, the main data 902 is arranged at the same position as the temporal data 901 and it can be seen that the temporal data 901 is replaced with the main data 902. In FIG. 9B, although another scene 910 with the same PV is illustrated, temporal data 911 is replaced with main data 912 in the scene 910.

As described above, in the present embodiment, by using a PV template generated for temporal data and replacing the temporal data with main data, similar PV data can be efficiently reconstructed.

The embodiment describes the case where the promotional video in which the three-dimensional model data generated from the images captured of the model is displayed in the virtual space is generated. However, the embodiment is not limited to the generation of the PV data. The three-dimensional model data can be used as game data for a virtual space. In addition, the techniques described in the embodiment can be applied to processing of operating a character in a virtual space. For example, the character can appear in an event, a concert, sports, an online meeting, and the like that are held in virtual spaces. Furthermore, the techniques described in the present embodiment can be applied in a video technique that is cross reality (XR) or the like and fuses the real world and a virtual world and makes it possible to perceive an object that does not exist in the real space.

As described above, in the present embodiment, it is possible to generate three-dimensional model data from images captured of an exterior of a model and cause the three-dimensional model data to appear in a user's favorite promotional video. Since the model may be finished as an original work by painting or the like by the user, like a ready-to-assemble plastic model, for example, and a feature of the model can be reflected in a character's expression in a video or a virtual space, it is possible to improve palatability.

CONCLUSION OF EMBODIMENTS

The above-described embodiments disclose at least an image processing method, an information processing apparatus, and a computer program as follows.

(1) An image processing method of reconstructing a video image including:
  causing a processing unit ("processor") to generate, from a plurality of images captured of an exterior of a model in a plurality of directions and generated by an imaging unit, first three-dimensional model data of the model included in the images;
  causing the processing unit to reconstruct the video image by replacing second three-dimensional model data with the first three-dimensional model data in template data of a video image constructed in advance to include the second three-dimensional model data; and
  causing an output unit ("output device") to output information indicating a destination from which the reconstructed video image is acquired.

(2) The image processing method described in (1), wherein the plurality of images include a marker for identifying an orientation and a position of the model, and the first three-dimensional model data is generated by correcting the orientation and the position based on the marker.

(3) The image processing method described in (1) or (2), wherein as the template data of the video image, a plurality of items of template data are prepared according to model types, and in the reconstructing, the video image is reconstructed for template data for which selection from a user has been accepted.

(4) The image processing method described in (3), wherein the model types include a first type of a model having an exterior shape obtained by reducing an original shape and a second type of a model having an exterior shape obtained by deforming the original shape.

(5) The image processing method described in (3) or (4), wherein in the generating, the first three-dimensional model data is generated by adjusting a size of the first three-dimensional model data to a size according to content of the video image.

(6) The image processing method described in (5), wherein the adjustment of the size is performed on the first three-dimensional model data of a model of the same type as a type of a model of the template data of the video image and is not performed on the first three-dimensional model data of a model of a type different from the type of the model of the template data of the video image.

(7) The image processing method described in any one of (1) to (6), wherein a pose recommended for the model is associated with the template data of the video image, and the plurality of images are captured of an exterior of the model in the recommended pose and generated.

(8) The image processing method described in any one of (1) to (7), further including causing the processing unit to accept selection of the template data of the video image.

(9) The image processing method described in (8), further including causing the processing unit to display, on a display apparatus, designation of a pose recommended for the video image in response to the acceptance of the selection of the template data of the video image.

(10) The image processing method described in any one of (1) to (9), wherein the plurality of directions are defined so as to cover a whole circumference of the model.

(11) The image processing method described in any one of (1) to (10), wherein the plurality of images are generated by causing the imaging unit to capture the plurality of images of the model illuminated by a first light source and one or more second light sources that offset a shadow caused by illuminating light from the first light source.

(12) The image processing method described in any one of (1) to (11) further including causing the processing unit to receive the plurality of images from the imaging unit.

(13) The image processing method described in any one of (1) to (12), wherein in the template data, information of at least any of a position and a movement of the second three-dimensional model data in a three-dimensional space, a camera angle, and lighting is set according to a time axis of the video image.

(14) An information processing apparatus including:
  a generating unit that generates, from a plurality of images captured of an exterior of a model in a plurality of directions and generated, first three-dimensional model data of the model included in the images;
  a reconstructing unit that reconstructs the video image by replacing second three-dimensional model data with the first three-dimensional model data in template data of a video image constructed in advance to include the second three-dimensional model data; and
  a control unit that controls an output unit to cause the output unit to output information indicating a destination from which the reconstructed video image is acquired.

(15) A computer program for causing a computer to execute the image processing method described in any one of (1) to (13).

The invention is not limited to the above-described embodiments, and various modifications and changes can be made without departing from the gist of the invention.

What is claimed is:

1. An image processing method of reconstructing a video image using a processor, the image processing method comprising:
    causing the processor to generate, from a plurality of images captured of an exterior of a model in a plurality of directions and generated by an imaging device, first three-dimensional model data of the model included in the images;
    causing the processor to reconstruct the video image by replacing second three-dimensional model data with the first three-dimensional model data in template data of a video image constructed in advance to include the second three-dimensional model data; and
    causing an output device to output information indicating a destination from which the reconstructed video image is acquired, wherein
    a pose recommended for the model is associated with the template data of the video image, and
    the plurality of images are captured of an exterior of the model in the recommended pose and generated.

2. The image processing method according to claim 1, wherein
    the plurality of images include a marker for identifying an orientation and a position of the model, and
    the first three-dimensional model data is generated by correcting the orientation and the position based on the marker.

3. The image processing method according to claim 1, wherein
    as the template data of the video image, a plurality of items of template data are prepared according to model types, and
    in the reconstructing, the video image is reconstructed for template data for which selection from a user has been accepted.

4. The image processing method according to claim 3, wherein the model types include a first type of a model having an exterior shape obtained by reducing an original shape and a second type of a model having an exterior shape obtained by deforming the original shape.

5. The image processing method according to claim 3, wherein in the generating, the first three-dimensional model data is generated by adjusting a size of the first three-dimensional model data to a size according to content of the video image.

6. The image processing method according to claim 5, wherein the adjustment of the size is performed on the first three-dimensional model data of a model of a same type as a type of a model of the template data of the video image and is not performed on the first three-dimensional model data of a model of a type different from the type of the model of the template data of the video image.

7. The image processing method according to claim 1, further comprising causing the processor to accept selection of the template data of the video image.

8. An image processing method of reconstructing a video image using a processor, the image processing method comprising:
    causing the processor to generate, from a plurality of images captured of an exterior of a model in a plurality of directions and generated by an imaging device, first three-dimensional model data of the model included in the images;
    causing the processor to reconstruct the video image by replacing second three-dimensional model data with the first three-dimensional model data in template data of a video image constructed in advance to include the second three-dimensional model data;
    causing an output device to output information indicating a destination from which the reconstructed video image is acquired;
    causing the processor to accept selection of the template data of the video image; and
    causing the processor to display, on a display apparatus, designation of a pose recommended for the video image in response to the acceptance of the selection of the template data of the video image.

9. The image processing method according to claim 1, wherein the plurality of directions are defined so as to cover a whole circumference of the model.

10. The image processing method according to claim 1, wherein the plurality of images are generated by causing the imaging device to capture the plurality of images of the model illuminated by a first light source and one or more second light sources that offset a shadow caused by illuminating light from the first light source.

11. The image processing method according to claim 1, further comprising causing the processor to receive the plurality of images from the imaging device.

12. An image processing method of reconstructing a video image using a processor, the image processing method comprising:
    causing the processor to generate, from a plurality of images captured of an exterior of a model in a plurality of directions and generated by an imaging device, first three-dimensional model data of the model included in the images;
    causing the processor to reconstruct the video image by replacing second three-dimensional model data with the first three-dimensional model data in template data of a video image constructed in advance to include the second three-dimensional model data; and
    causing an output device to output information indicating a destination from which the reconstructed video image is acquired, wherein
    in the template data, information of at least any of a position and a movement of the second three-dimensional model data in a three-dimensional space, a camera angle, and lighting is set according to a time axis of the video image.

13. An information processing apparatus, comprising:
    a processor; and
    a non-transitory storage medium having program instructions stored thereon, execution of the program instructions by the processor causing the information processing apparatus to provide functions of:
        a generating unit that generates, from a plurality of images captured of an exterior of a model in a plurality of directions and generated, first three-dimensional model data of the model included in the images;
        a reconstructing unit that reconstructs the video image by replacing second three-dimensional model data with the first three-dimensional model data in template data of a video image constructed in advance to include the second three-dimensional model data; and a control unit that controls an output device to cause the output device to output information indicating a destination from which the reconstructed video image is acquired, wherein a pose recommended for the model is associated with the template data of the video image, and the plurality of images are captured of an exterior of the model in the recommended pose and generated.

14. A computer program product, comprising:
a non-transitory storage medium having program instructions stored thereon, the program instructions including:
   instructions to cause a computer to execute the image processing method according to claim 1.

* * * * *